(12) United States Patent
Zhang et al.

(10) Patent No.: US 12,366,760 B2
(45) Date of Patent: Jul. 22, 2025

(54) THIN FILM TYPE IMAGE SLICER DEVICE AND OPERATING SYSTEM THEREOF

(71) Applicant: NANJING INSTITUTE OF ASTRONOMICAL OPTICS & TECHNOLOGY, NATIONAL ASTRONOMICAL OBSERVATORIES, CAS, Jiangsu (CN)

(72) Inventors: Kai Zhang, Jiangsu (CN); Yongtian Zhu, Jiangsu (CN); Lei Wang, Jiangsu (CN); Zhen Tang, Jiangsu (CN); Hangxin Ji, Jiangsu (CN); Zhongwen Hu, Jiangsu (CN); Yi Chen, Jiangsu (CN)

(73) Assignee: NANJING INSTITUTE OF ASTRONOMICAL OPTICS & TECHNOLOGY, NATIONAL ASTRONOMICAL OBSERVATORIES, CAS, Jiangsu (CN)

( * ) Notice: Subject to any disclaimer, the term of this patent is extended or adjusted under 35 U.S.C. 154(b) by 377 days.

(21) Appl. No.: 18/044,961

(22) PCT Filed: Apr. 23, 2021

(86) PCT No.: PCT/CN2021/089199
§ 371 (c)(1),
(2) Date: Mar. 10, 2023

(87) PCT Pub. No.: WO2022/057258
PCT Pub. Date: Mar. 24, 2022

(65) Prior Publication Data
US 2023/0359053 A1    Nov. 9, 2023

(30) Foreign Application Priority Data

Sep. 21, 2020    (CN) .......................... 202010995892.9

(51) Int. Cl.
*G02B 27/10*    (2006.01)
*G02B 1/10*    (2015.01)

(52) U.S. Cl.
CPC .............. *G02B 27/106* (2013.01); *G02B 1/10* (2013.01)

(58) Field of Classification Search
CPC ................................ G02B 27/106; G02B 1/10
(Continued)

(56) References Cited

FOREIGN PATENT DOCUMENTS

WO    WO-9415240 A1 *    7/1994    ........... G02B 27/144

* cited by examiner

*Primary Examiner* — William Choi
(74) *Attorney, Agent, or Firm* — MUNCY, GEISSLER, OLDS & LOWE, P.C.

(57) ABSTRACT

A thin film type image slicer device comprises a main body prism, a flat optical element, and an optical film. A reflective cavity is formed between the optical film and a second surface of the flat optical element; the optical film has an oblique side at an angle θ with respect to a projection direction of a light beam reflection forward direction in the reflective cavity; the light beam repeatedly passes through the oblique side in the reflection forward direction; an image spot is sliced into a plurality of sliced images with the same width; and the plurality of sliced images are linearly arranged in an arrangement direction perpendicular to the slicing direction; and chief rays of the light beam corresponding to each sliced image are parallel to each other. An operating system includes a pre-optical system, the thin film type image slicer device and a subsequent optical system.

10 Claims, 4 Drawing Sheets

(58) Field of Classification Search
USPC .......................................................... 359/618
See application file for complete search history.

THIN FILM TYPE IMAGE SLICER DEVICE AND OPERATING SYSTEM THEREOF

TECHNICAL FIELD

The present invention belongs to the field of optical technology, in particular astronomical optics and spectrographs, and particularly relates to an image slicer device and an operating system thereof.

BACKGROUND ART

When astronomical spectral observation is carried out on the ground, the starlight converges at the slit of the spectrograph, and after passing through the slit, forms a spectrum with a certain resolution through dispersion. In order to increase the spectral resolution, it is often necessary to make the width of the slit narrower than the diameter of the stellar image, resulting in most of the light being blocked out of the slit and not available. The image slicer divides the stellar image into a plurality of sliced images with the same width along the slit width direction, and arranges the sliced images along the slit length direction, so that most of the starlight can enter the spectrograph, solving the contradiction between the spectral resolution and the starlight utilization. In 1938, I. S. Bowen first designed an image slicer made of stacked thin mirrors. With the progress of optical manufacturing technology, it has been gradually applied to the field of astronomical observation since 1980s. Various types of image slicers have emerged. In most image slicers, the optical glass edge is used as a tool to slice an image spot. The optical manufacturing quality of the glass edge, including edge breakage, straightness and angle, directly determines the working effect of the image slicer. During the late 1990s, the related optical manufacturing technologies are gradually improved, but the actual problems of low yield and glass fragility are still not well solved. Among them, the edge breakage will lead to irregular contour of sliced image spots and produce harmful stray light. The straightness and angle errors will lead to the inability to slice the image spot with equal width, reducing the working effect. On the other hand, none of the existing image slicers has a steering function for the outgoing direction of the light beam. The direction of the outgoing light beam is the same as that of the incident light beam.

It can be seen from the search results of the prior art that all the current image slicers keep using an optical glass edge as a tool for slicing an image spot, and thus cannot effectively solve the above-mentioned problem. None of the existing domestic patent of image slicer involves or achieves the linear arrangement of sliced images through other components. None of the existing image slicers involve or achieve the steering function of the outgoing light beam by other means.

SUMMARY OF THE INVENTION

The object of the present invention is directed to solve the problems of the optical glass edge of the classic image slicer such as unsatisfactory working effect, low yield and being unable to be mass-produced due to the defects in the manufacturing process, and to increase the outgoing light beam turning function. A thin film type image slicer device and an operating system thereof are proposed. The invention has the technical characteristics of high accuracy of slicing, long service life, high yield and high feasibility of mass production, and can also have the outgoing light beam turning function.

In order to achieve the above object, the present invention provides the following technical solutions.

The present invention provides a thin film type image slicer device, comprising a main body prism, a flat optical element, and an optical film, wherein the main body prism comprises a first surface of the main body prism and a second surface of the body prism at an angle $\alpha$ to each other; the flat optical element has a first surface of the flat optical element close to the second surface of the main body prism and a second surface of the flat optical element away from the second surface of the main body prism; an optical film is provided between the main body prism and the flat optical element; a reflective cavity is formed between the optical film and the second surface of the flat optical element; an incident light beam is incident from the first surface of the main body prism, and is reflected and transmitted forwards in a zigzag manner in the reflective cavity; the optical film has an oblique side at an angle $\theta$ with respect to a projection direction of a light beam reflection forward direction in the reflective cavity; the light beam repeatedly passes through the oblique side in the reflection forward direction; an image spot is sliced into a plurality of sliced images with the same width; and the plurality of sliced images are linearly arranged in an arrangement direction perpendicular to the slicing direction.

Further, the incident light beam is a slow focal ratio beam having a telecentric optical path characteristic.

Further, the focal ratio of the incident light beam is slower than F/15.

Further, the optical film is an optical external reflection film plated on the second surface of the main body prism and/or an optical internal reflection film plated on the first surface of the flat optical element.

Further, the device comprises a turning prism. The main body prism further comprises a third surface of the main body prism from which a light beam is outgoing; the turning prism comprises a first surface of the turning prism, a second surface of the turning prism and a third surface of the turning prism; the first surface of the turning prism is connected to the third surface of the main body prism; and after being reflected by the second surface of the turning prism, the light beam is outgoing from the third surface of the turning prism, wherein the included angle between the first surface of the turning prism and the second surface of the turning prism is $\beta$.

Further, the type of the main body prism comprises a trapezoidal prism, a triangular prism, and a rhombic prism; and the main body prism is a single optical element or an optical assembly formed by combining a plurality of optical elements.

Further, the chief rays of the light beam corresponding to each sliced image are parallel to each other.

Further, simultaneous slicing of a plurality of image spots are allowed.

Further, the number of slicing of a single image spot is between 2 and 5.

The present invention also provides a operating system based on a thin film type image slicer device, comprising a pre-optical system, the above-mentioned thin film type image slicer device and a subsequent optical system, wherein an image spot emits a slow focus ratio light beam having a telecentric optical path characteristic via the pre-optical system; the light beam enters the thin film type image slicer device from a first surface of a main body prism to obtain a plurality of sliced images of equal width; the plurality of sliced images are linearly arranged along an arrangement direction perpendicular to the slicing direction; the light beams corresponding to all the sliced images are emitted from the thin film type image slicer device, enter the subsequent optical system, and are imaged into a plurality of sliced images of equal width and arranged linearly.

Compared to the prior art, the invention has the following beneficial effects.

(1) The border of optical film instead of the classical optical glass edge as a tool to slice the image spot can avoid the optical manufacturing problems of edge breakage, poor straightness and angle error of the glass edge, which can effectively improve the accuracy of slicing and inhibit stray light.

(2) The specified optical film technical parameters are obtained by mature coating technology, and the yield is high. The tooling equipment involved can be repeatedly used to facilitate batch production.

(3) The optical film is sealed between the second surface of the main body prism and the first surface of the plate glass to effectively protect the optical film from breakage, contamination, and oxidation, resulting in a decrease in optical performance and an increase in service life.

(4) Choosing different types of main body prism and turning prism for combination can change the included angle between the optical axis of the incident light beam and the outgoing light beam, so as to facilitate matching the subsequent optical system.

Figure 1:
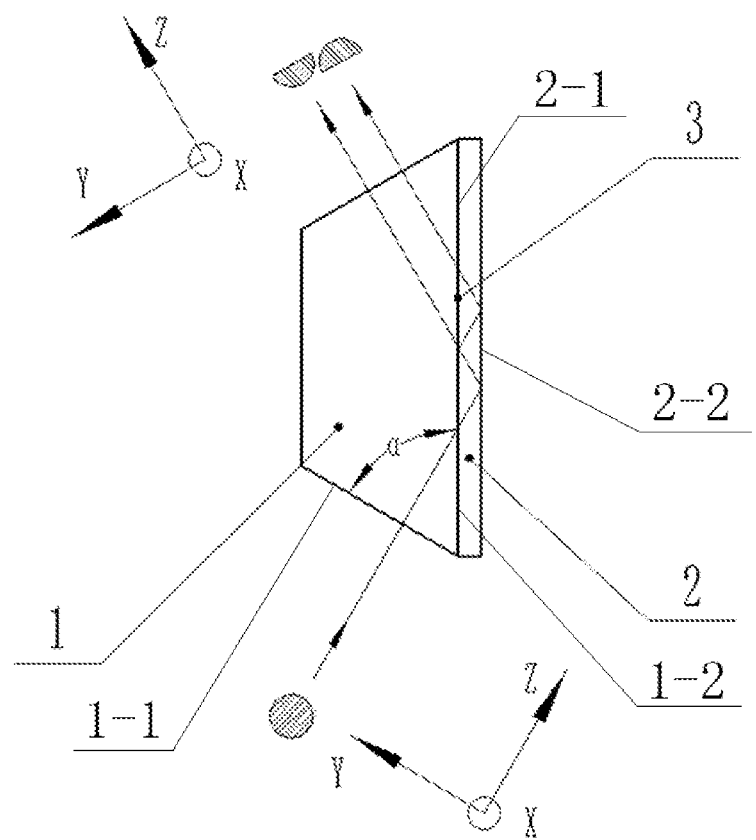
FIG. 1 is a front view of a structure A of a thin film type image slicer device.

REFERENCE NUMBERS IN THE DRAWINGS 1, main body prism; 1-1, first surface of the main body prism; 1-2, second surface of the main body prism; 1-3, third surface of the main body prism; 2, flat optical element; 2-1, first surface of a flat optical element; 2-2, second surface of the flat optical element; 3, optical film; 4, turning prism; 4-1, first surface of the turning prism; 4-2, second surface of the turning prism; 4-3, third surface of the turning prism; 5, image spot; 6, pre-optical system; 7, subsequent optical system; 8, sliced image.

DETAILED DESCRIPTION OF THE INVENTION

The invention will be described in further detail with reference to the accompanying drawings.

Direction Definition: (1) The width direction of the sliced image spot is called a slicing direction (X); (2) a length direction perpendicular to the slicing direction (X) is referred to as an arrangement direction (Y); (3) the direction of propagation of the light beam along the optical axis is referred to as an optical axis direction (Z).

Embodiment 1

Figure 2:
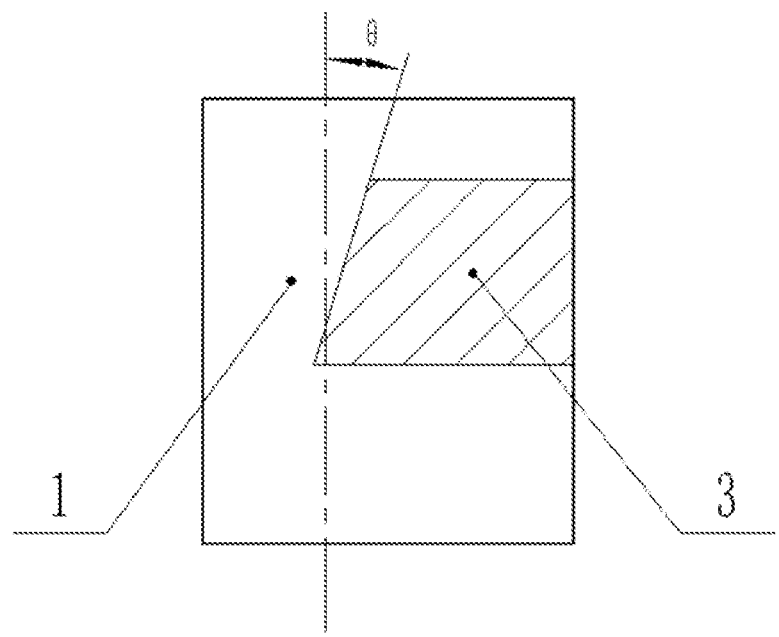
FIG. 2 is a partial sectional view taken along the direction A-A in FIG. 1.

This embodiment provides a structure A of a thin film type image slicer device as shown in FIG. 1, including a main body prism 1, a flat optical element 2 (e.g. plate glass), and an optical film 3. The body prism 1 includes a first surface 1-1 of the main body prism and a second surface 1-2 of the main body prism. The first surface 1-1 of the main body prism and the second surface 1-2 of the main body prism form an angle $\alpha$ with each other. The angle $\alpha$ between the first surface 1-1 of the main body prism and the second surface 1-2 of the main body prism provides an angle of incidence required for slicing an image spot. In this embodiment, the incident light beam is incident perpendicularly to the first surface 1-1 of the main body prism. At this moment, the angle $\alpha$ is less than 90° in order for the light beam to illuminate the flat optical element 2. In order to generate an image spot of the light beam illuminated to the flat optical element 2, the incident light beam is a converging light beam. The flat optical element 2 has a first surface 2-1 of the flat optical element close to a second surface 1-2 of the main body prism and a second surface 2-2 of the flat optical element away from a second surface 1-2 of the main body prism. As shown in FIG. 1, an optical film 3 is provided between a main body prism 1 and a flat optical element 2. The optical film 3 is plated in a local area with a bevel edge, and the bevel edge thereof is used for slicing an image spot. The corresponding bevel angle is $\theta$. The position, size and shape included angle of the optical film 3 are set according to the conditions of the incident focus ratio. See the local sectional view of FIG. 2 for the size of the image spot and the number of slicing. A reflective cavity is formed between the optical film 3 and the second surface 2-2 of the flat optical element, in which a light beam is reflected and transmitted forwards in a zigzag manner while the image spot is sliced. The sliced images of equal width are sliced with the bevel edge and the remaining portion of the light beam is reflected back into the reflective cavity. The incident convergent light beam is incident from the first surface 1-1 of the main body prism, and is reflected and transmitted forwards in the reflective cavity in a zigzag manner. The optical film 3 has an oblique side at an angle $\theta$ with respect to a projection direction of the reflection forward direction of the light beam in the reflective cavity. The light beam repeatedly passes through the oblique side in the forward direction. An image spot is sliced into a plurality of sliced images of with the same width. The plurality of sliced images is linearly arranged in an arrangement direction perpendicular to the slicing direction. Chief rays of the light beam corresponding to each sliced image are parallel to each other. The included angle between the optical axes of the incident light beam and the outgoing light beam is 180°−2*$\alpha$.

Embodiment II

Figure 3:
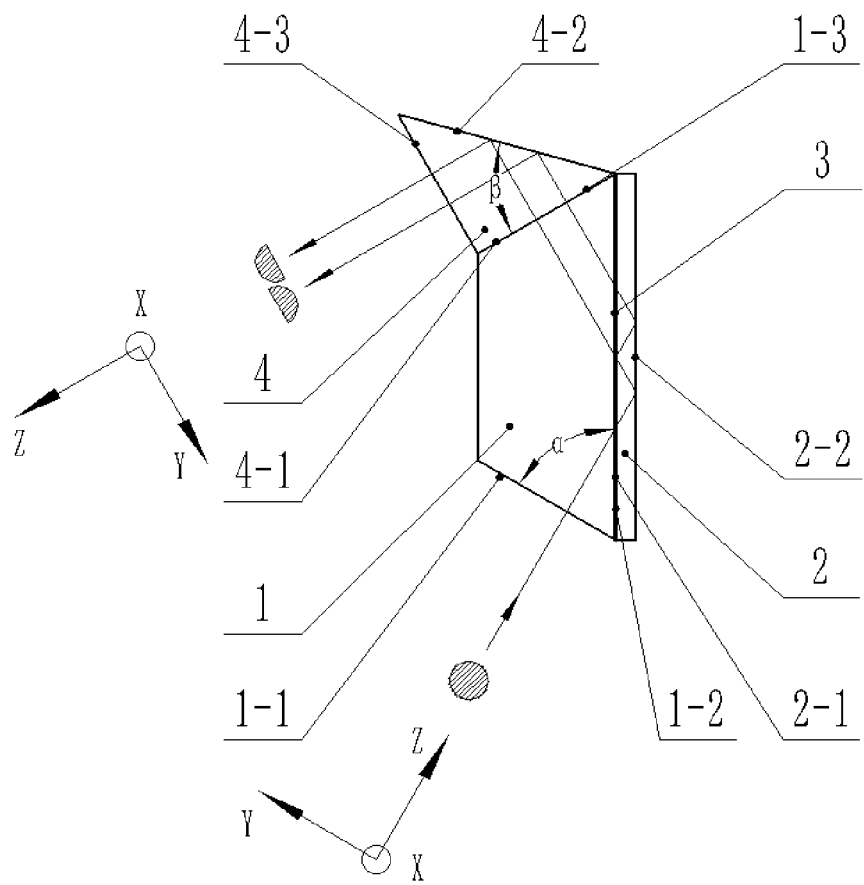
FIG. 3 is a front view of a structure B of a thin film type image slicer device.

This embodiment provides a structure B of a thin film type image slicer device as shown in FIG. 3, including a main body prism 1 (an isosceles trapezoidal prism is particularly preferred in this embodiment), a flat optical element 2 (for example, a sheet glass), an optical film 3, and a turning prism 4 (an isosceles triangular prism is particularly preferred in this embodiment). The main body prism 1 includes a first surface 1-1 of the main body prism, a second surface 1-2 of the main body prism, and a third surface 1-3 of the main body prism. The first surface 1-1 of the main body prism and the second surface 1-2 of the main body prism form an angle α with each other. The angle α between the first surface 1-1 of the main body prism and the second surface 1-2 of the main body prism provides an angle of incidence required for slicing an image spot. In this embodiment, the incident light beam is incident perpendicularly to the first surface 1-1 of the main body prism. At this moment, the angle α is less than 90° in order for the light beam to illuminate the flat optical element 2. The light beam is outgoing from the third surface 1-3 of the main body prism. In order to generate an image spot of the light beam illuminated to the plate optical element 2, the incident light beam is a converging light beam. The turning prism 2 includes a first surface 4-1 of the turning prism, a second surface 4-2 of the turning prism and a third surface 4-3 of the turning prism. The flat optical element 2 has a first surface 2-1 of the flat optical element close to a second surface 1-2 of the main body prism and a second surface 2-2 of the flat optical element away from a second surface 1-2 of the main body prism. As shown in FIG. 3, an optical film 3 is provided between a main body prism 1 and a flat plate optical element 2. The optical film 3 is plated in a local area with a bevel edge, and the bevel edge thereof is used for slicing an image spot. The corresponding bevel angle is θ. The position, size and shape included angle of the optical film 3 are set according to the conditions of the incident focus ratio. See the local sectional view of FIG. 2 for the size of the image spot and the number of slicing. A reflective cavity is formed between the optical film 3 and the second surface 2-2 of the flat optical element, in which a light beam is reflected and transmitted forwards in a zigzag manner while the image spot is sliced. The sliced images of equal width are sliced with the bevel edge and the remaining portion of the light beam is reflected back into the reflective cavity. The incident convergent light beam is incident from the first surface 1-1 of the main body prism, and is reflected and transmitted forwards in the reflective cavity in a zigzag manner. The optical film 3 has an oblique side at an angle θ with respect to a projection direction of the reflection forward direction of the light beam in the reflective cavity. The light beam repeatedly passes through the oblique side in the forward direction. An image spot is sliced into a plurality of divided images of with the same width. The plurality of sliced images is linearly arranged in an arrangement direction perpendicular to the slicing direction. Chief rays of the light beam corresponding to each sliced image are parallel to each other. The first surface 4-1 of the turning prism is connected to the third surface 1-3 of the main body prism. The light beam is outgoing from the third surface 4-3 of the turning prism after subjecting to the turning direction of the second surface 4-2 of the turning prism. The included angle between the first surface 4-1 of the turning prism and the second surface 4-2 of the turning prism is β. The oblique angle α of the main body prism 1 and the oblique angle β of the turning prism 4 determine the direction of the outgoing light beam. The included angle between the optical axes of the incident light beam and the outgoing light beam is $360°-2*(α+β)$. The turning prism 4 is used to provide an outgoing light beam turning function. The third surface 4-3 of the turning prism is a light beam outgoing surface. The light beam is outgoing perpendicularly to the surface.

In this embodiment, the normal line to the first surface 1-1 of the main body prism is coplanar with the normal line to the second surface 4-2 of the turning prism.

Embodiment III

Figure 4:
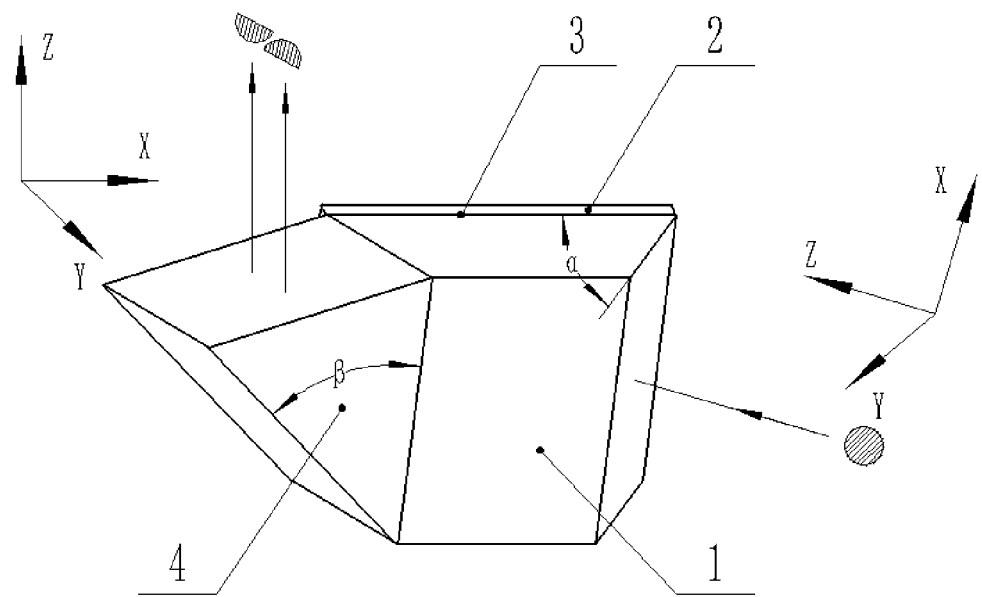
FIG. 4 is a front view of a structure C of a thin film type image slicer device.

This embodiment provides a structure C of a thin film type image slicer device as shown in FIG. 4, including a main body prism 1 (an isosceles trapezoidal prism is particularly preferred in this embodiment), a flat optical element 2 (for example, a sheet glass), an optical film 3, and a turning prism 4 (an isosceles triangular prism is particularly preferred in this embodiment). The main body prism 1 includes a first surface 1-1 of the main body prism, a second surface 1-2 of the main body prism, and a third surface 1-3 of the main body prism. The first surface 1-1 of the main body prism and the second surface 1-2 of the main body prism form an angle α with each other. The angle α between the first surface 1-1 of the main body prism and the second surface 1-2 of the main body prism provides an angle of incidence required for slicing an image spot. In this embodiment, the incident light beam is incident perpendicular to the first surface 1-1 of the main body prism. At this moment, the angle α is less than 90° in order for the light beam to illuminate the flat optical element 2. The light beam outgoes from the third surface 1-3 of the main body prism. In order to generate an image spot of the light beam illuminated to the plate optical element 2, the incident light beam is a converging light beam. The turning prism 2 includes a first surface 4-1 of the turning prism, a second surface 4-2 of the turning prism and a third surface 4-3 of the turning prism. The flat optical element 2 has a first surface 2-1 of the flat optical element close to a second surface 1-2 of the main body prism and a second surface 2-2 of the flat optical element away from a second surface 1-2 of the main body prism. As shown in FIG. 4, an optical film 3 is provided between a main body prism 1 and a flat plate optical element 2. The optical film 3 is plated in a local area with a bevel edge, and the bevel edge thereof is used for slicing an image spot. The corresponding bevel angle is θ. The position, size and shape included angle of the optical film 3 are set according to the conditions of the incident focus ratio. See the local sectional view of FIG. 2 for the size of the image spot and the number of slicing. A reflective cavity is formed between the optical film 3 and the second surface 2-2 of the flat optical element, in which a light beam is reflected and transmitted forwards in a zigzag manner while the image spot is sliced. The sliced images of equal width are sliced with the bevel edge and the remaining portion of the light beam is reflected back into the reflective cavity. The incident convergent light beam is incident from the first surface 1-1 of the main body prism, and is reflected and transmitted forwards in the reflective cavity in a zigzag manner. The optical film 3 has an oblique side at an angle θ with respect to a projection direction of the forward direction of the light beam in the reflective cavity. The light beam repeatedly passes through the oblique side during the reflection and advancing. An image spot is sliced into a plurality of divided images of with the same width. The plurality of sliced images is linearly arranged in an arrangement direction perpendicular to the slicing direction. Chief rays of the light beam corresponding to each sliced image are parallel to each other. The first surface 4-1 of the turning prism is connected to the third surface 1-3 of the main body prism. The light beam is outgoing from the third surface 4-3 of the turning prism after subjecting to the turning direction of the second surface 4-2 of the turning prism. The included angle between the first surface 4-1 of the turning prism and the second surface 4-2 of the turning prism is β. The oblique angle α of the main body prism 1 and the oblique angle β of the turning prism 4 determine the direction of the outgoing light beam. The included angle α is not coplanar with the included angle β. The included angle between the optical axes of the incident light beam and the outgoing light beam is a two-dimensional spatial angle. The turning prism 4 is used to provide an outgoing light beam turning function. The third surface 4-3 of the turning prism is a light beam outgoing surface. The light beam is outgoing perpendicularly to the surface.

In this embodiment, the normal line to the first surface 1-1 of the main body prism is not coplanar with the normal line to the second surface 4-2 of the turning prism. The included angle between the optical axes of the incident light beam and the outgoing light beam is a two-dimensional spatial angle.

Embodiment IV

Figure 5:
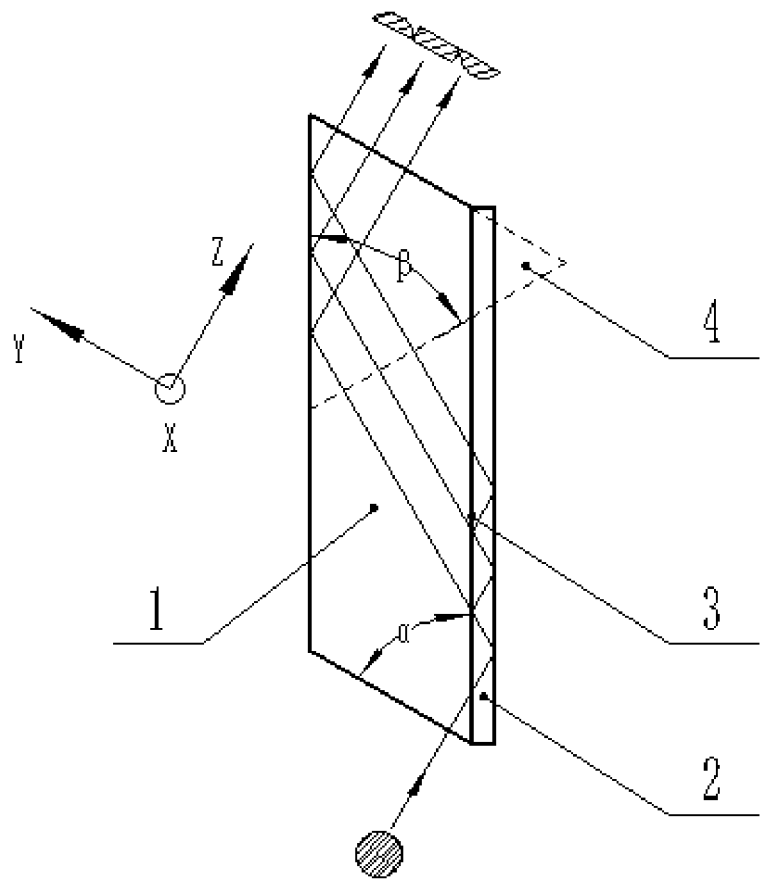
FIG. 5 is a front view of a structure D of a thin film type image slicer device.

This embodiment provides a structure D of a thin film type image slicer device as shown in FIG. 5. In the structure B of the thin film type image slicer device, when the normal line of the first surface 1-1 of the main body prism 1 is coplanar with the normal line of the third surface 4-3 of the turning prism and the included angle between the optical axes of the incident light beam and the emergent beam is 0°, the combination of the main body prism 1 and the turning prism 4 may be replaced by a rhombic prism, i.e., the main body prism 1 is a rhombic prism and the turning prism 4 is eliminated.

Embodiment V

Figure 6:
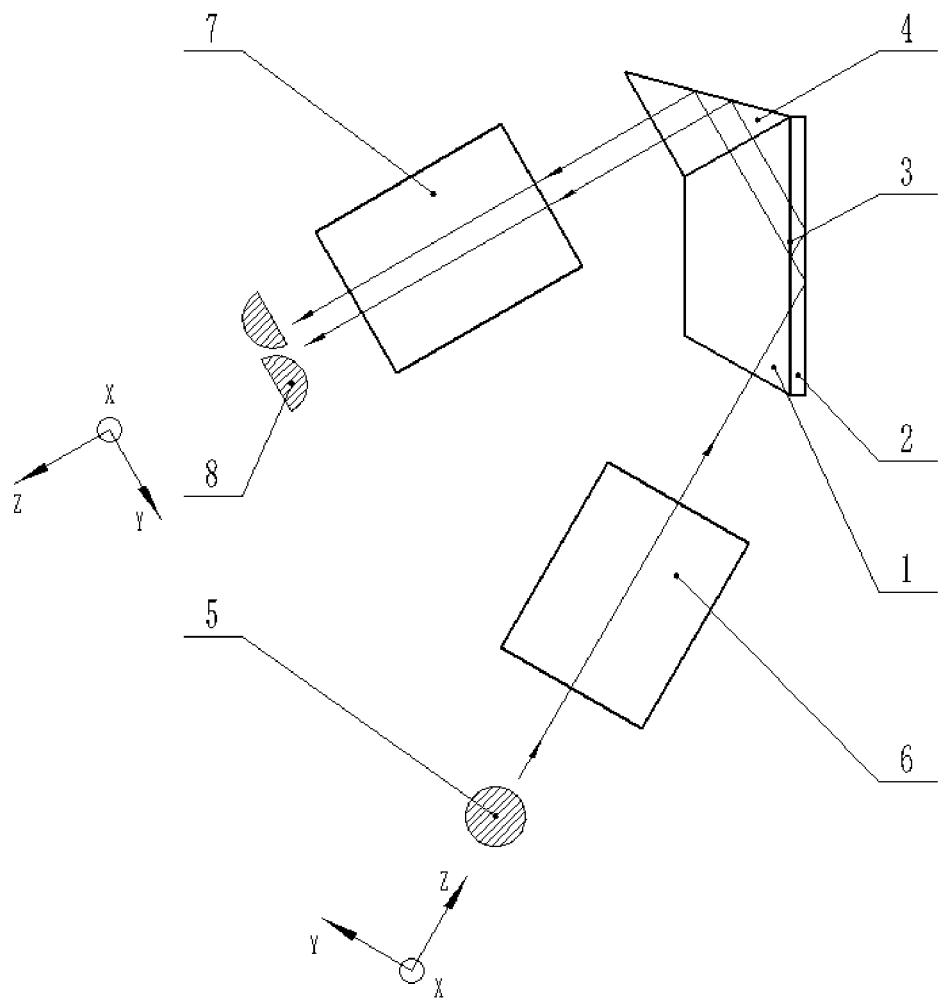
FIG. 6 is a schematic view of an operating system of the thin film type image slicer device.

This embodiment provides an operating system based on the film type image slicer device of the present invention as shown in FIG. 6, which includes a pre-optical system 6, a film type image slicer device, and a subsequent optical system 7.

The image spot 5 emits a slow focal ratio light beam having a telecentric optical path characteristic via the pre-optical system 6. The light beam enters the device from the first surface of the main body prism 1 along the optical axis direction (Z). The incident light beam passes through the second surface 1-2 of the main body prism 1 and enters a reflective cavity formed by the optical film 3 and the second surface 2-2 of the flat optical element 2. The light beam is reflected in the reflective cavity in a zigzag manner to propagate forwards. When the light beam contacts the optical film 3, the oblique side of the optical film 3 having a certain oblique angle θ slices the image spot with the same width. The sliced image passes through the second surface 1-2 of the main body prism 1, and the remaining light beam reflects back into the reflective cavity and continues to reflect and advance. After several times of slicing, a plurality of sliced images of equal width are obtained, and successively arranged along an arrangement direction (Y). Chief rays corresponding to each sliced image are parallel to each other. The light beams corresponding to all the sliced images are emitted from the thin film type image slicer device, enter the subsequent optical system 7, and are imaged into a plurality of sliced images 8 of equal width and arranged linearly.

It should be noted that, in order to ensure the use effect of the film-type image slicer in the above-mentioned embodiment, the use of the film-type image slicer preferably satisfies two conditions. (1) The focal ratio of incident converging light must be slower than F/15. (2) The incident light beam must satisfy the condition of the telecentric optical path, i.e., the exit pupil is at infinity. For example, when the incident focal ratio of the convergent light beam is F/20 and the image spot is sliced into two sliced images with the same width. The contour of the sliced image is clear and the image quality is high. When using the structure B of the thin film type image slicer device, the included angle between the optical axes of the outgoing light beam and the incident light beam is 150°. There is no obvious degradation of the slicing effect and image quality in use for more than 3 years.

It is also noted that the plating of the optical film can be selected according to practical requirements. For example, an optical internal reflection film may be plated on the first surface 2-1 of the flat optical element, or an optical external reflection film may be plated on the second surface 1-2 of the main body prism.

It should be noted that the type of the main body prism 1 in the present invention is not limited to an isosceles trapezoidal prism. The main body prism 1 may be replaced by a trapezoidal prism, a triangular prism, a rhombic prism or other types of prisms of other shapes. The main body prism 1 is not limited to a single optical element, and may be an optical assembly formed by combining a plurality of optical elements.

It should be noted that the present invention allows simultaneous slicing of a plurality of image spots (e.g., simultaneous slicing of 1 to 3 image spots). The number of slicing of a single image spot may be several (e.g., the above embodiments may make a slicing of 2-5 sliced images).

It should be noted that the above-mentioned embodiments merely list several ways of turning the turning prism 4. Based on the above-mentioned embodiments, a person skilled in the art would be able to deduce a greater variety of ways of changing the direction of the emergent light beam by introducing different types or mounting directions of the turning prism 4, which fall within the scope of the present invention.

In summary, the present invention uses the plated optical film instead of the classical optical glass edge as a tool for slicing an image spot. The optical film plated on the front surface of the flat glass and the rear surface thereof capable of generating total reflection form a reflective cavity, so that the light beam is reflected and transmitted forwards in the reflective cavity in a zigzag manner. The image spot repeatedly passes through the optical glass edge forming an included angle with the projection direction of the forward direction in the light beam progress. A plurality of sliced images of equal width are sliced and are arranged in an arrangement direction (Y). In addition, the present invention can change the emergent direction of the light beam by flexibly changing the types and combinations of the main body prism 1 and the turning prism 4 to match the requirements of different application environments.

The above description is of preferred embodiments of the invention and is not intended to limit the invention. Any modifications, equivalents, improvements, etc. within the spirit and principles of this invention are intended to be included within the scope of this invention.

The invention claimed is:

1. A thin film type image slicer device, characterized by comprising a main body prism, a flat optical element, and an optical film, wherein the main body prism comprises a first surface of the main body prism and a second surface of the body prism at an angle α to each other; the flat optical element has a first surface of the flat optical element close to the second surface of the main body prism and a second surface of the flat optical element away from the second surface (1-2) of the main body prism; an optical film is provided between the main body prism and the flat optical element; a reflective cavity is formed between the optical film and the second surface of the flat optical element; an incident light beam is incident from the first surface of the main body prism, and is reflected and transmitted forwards in a zigzag manner in the reflective cavity; the optical film has an oblique side at an angle θ with respect to a projection direction of a light beam reflection forward direction in the reflective cavity; the light beam repeatedly passes through the oblique side in the reflection forward direction; an image spot is sliced into a plurality of sliced images with the same width; and the plurality of sliced images are linearly arranged in an arrangement direction perpendicular to the slicing direction.

2. The thin film type image slicer device according to claim 1, wherein the incident light beam is a slow focal ratio beam having a telecentric optical path characteristic.

3. The thin film type image slicer device according to claim 2, wherein the focal ratio of the incident light beam is slower than F/15.

4. The thin film type image slicer device according to claim 1, wherein the optical film is an optical external reflection film plated on the second surface of the main body prism and/or an optical internal reflection film plated on the first surface of the flat optical element.

5. The thin film type image slicer device according to claim 1, further comprising a turning prism, the main body prism being a triangular prism and further comprising a third surface of the main body prism from which a light beam is outgoings; the turning prism comprises a first surface of the turning prism, a second surface of the turning prism and a third surface of the turning prism; the first surface of the turning prism is connected to the third surface of the main body prism; and after being totally reflected by the second surface of the turning prism, the light beam is outgoing from the third surface of the turning prism, wherein the included angle between the first surface of the turning prism and the second surface of the turning prism is β.

6. The thin film type image slicer device according to claim 1, wherein the type of the main body prism comprises a trapezoidal prism, a triangular prism, and a rhombic prism; and the main body prism is a single optical element or an optical assembly formed by combining a plurality of optical elements.

7. The thin film type image slicer device according to claim 1, wherein chief rays of the light beam corresponding to each sliced image are parallel to each other.

8. The thin film type image slicer device according to claim 1, wherein simultaneous slicing of a plurality of image spots are allowed.

9. The thin film type image slicer device according to claim 1, wherein the number of slicing of a single image spot is between 2 and 5.

10. An operating system based on a thin film type image slicer device, comprising a pre-optical system, the thin film type image slicer device as claimed in claim 1, and a subsequent optical system, wherein an image spot emits a slow focus ratio light beam having a telecentric optical path characteristic via the pre-optical system; the light beam enters the thin film type image slicer device from a first surface of a main body prism to obtain a plurality of sliced images of equal width; the plurality of sliced images are linearly arranged along an arrangement direction perpendicular to the slicing direction; and the light beams corresponding to all the sliced images are emitted from the thin film type image slicer device, enter the subsequent optical system, and are imaged into a plurality of sliced images of equal width and arranged linearly.

* * * * *